United States Patent
Kiani et al.

(10) Patent No.: US 6,736,546 B2
(45) Date of Patent: May 18, 2004

(54) OPTICAL CONNECTOR FERRULE DESIGNED TO MINIMIZE MANUFACTURING IMPERFECTIONS AND MATING MISALIGNMENTS BY INCORPORATING EXACT CONSTRAINT PRINCIPLES

(75) Inventors: Sepehr Kiani, Watertown, MA (US); Ryan R. Vallance, Lexington, KY (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 10/195,951

(22) Filed: Jul. 16, 2002

(65) Prior Publication Data

US 2003/0044123 A1 Mar. 6, 2003

Related U.S. Application Data

(60) Provisional application No. 60/316,593, filed on Aug. 31, 2001.

(51) Int. Cl.[7] .................................................. G02B 6/38
(52) U.S. Cl. ........................................................ 385/59
(58) Field of Search ........................ 385/59, 60, 62, 385/65

(56) References Cited

U.S. PATENT DOCUMENTS

| | | | |
|---|---|---|---|
| 4,818,058 A | 4/1989 | Bonanni | 350/96.2 |
| 4,830,456 A | 5/1989 | Kakii et al. | 350/96.2 |
| 4,915,472 A | 4/1990 | Liu | 350/96.21 |
| 5,416,868 A | 5/1995 | Kakii et al. | 385/80 |
| 5,519,798 A | 5/1996 | Shahid et al. | 385/65 |
| 5,548,677 A | 8/1996 | Kakii et al. | 385/92 |
| 5,631,985 A | 5/1997 | Yamada et al. | 385/59 |
| 5,963,691 A | 10/1999 | Bunin et al. | 385/78 |
| 6,168,317 B1 | 1/2001 | Shahid | 385/71 |
| 6,243,518 B1 | 6/2001 | Lee et al. | 385/59 |
| 6,328,479 B1 | 12/2001 | Schofield et al. | 385/65 |
| 6,367,985 B1 | 4/2002 | Lee et al. | 385/59 |
| 6,425,693 B2 | 7/2002 | Schmatz | 85/59 |

OTHER PUBLICATIONS

Slocum, Alexander H., "Precision Machine Design."; 1992; 352–354.

Blanding, Douglas L., "Exact Constraint: Machine Design Using Kinematic Principles." 1999; 1–108.

*Primary Examiner*—Tulsidas C. Patel
(74) *Attorney, Agent, or Firm*—David H. Hwang; Teradyne Legal Dept.

(57) ABSTRACT

A ferrule assembly, in a preferred embodiment, having a first ferrule, a second ferrule, and at least two alignment members to align the first and second ferrules during mating is provided. The first ferrule, the second ferrule and the alignment members interact at the mating interface of the first and second ferrules to provide three constraint lines. In one embodiment, the first ferrule has a body with at least one channel for receiving at least one optical fiber. The first ferrule body includes a first surface portion for retaining a first alignment member and a second surface portion for retaining a second alignment member, the first and second surface portions being V-shaped. The second ferrule has a body with at least one channel for receiving at least one optical fiber. The second ferrule body includes a first surface portion for retaining the first alignment member and a second surface portion for retaining the second alignment member, the first surface portion being V-shaped and the second surface portion being flat.

15 Claims, 16 Drawing Sheets

OPTICAL CONNECTOR FERRULE DESIGNED TO MINIMIZE MANUFACTURING IMPERFECTIONS AND MATING MISALIGNMENTS BY INCORPORATING EXACT CONSTRAINT PRINCIPLES

CROSS-REFERENCE TO RELATED APPLICATION

This application claims priority of earlier filed U.S. Provisional Application Serial No. 60/316,593, filed Aug. 31, 2001, entitled, "Ferrule Designed to Accommodate Manufacture Tolerance Ranges and Imperfections by Incorporating Kinematic Concepts".

BACKGROUND OF THE INVENTION

The present invention relates to an optical connector ferrule. More specifically, the present invention relates to an optical connector ferrule designed for supporting and aligning precision optical fibers via exact constraint principles to aid in minimizing manufactured imperfections and mating misalignments.

As the need for bandwidth in society increases, copper-based telecommunications systems become less desirable due to their limited data carrying capacity. Thus, high-speed systems having optical fiber transmission paths that transmit light representing data signals were developed to meet the bandwidth needs. Data can be transmitted at very high rates (e.g., 10 gigabits per second) in a single optical fiber.

In order for an optical fiber to provide such high data transmission rates, it must be manufactured with precise tolerances and composed of specialty materials. Generally, an optical fiber is made from ultrapure silica in which dopants (e.g., $GeO_2$) have been added in a controlled manner. The optical fiber has an inner silica layer, referred to as the "core", covered by a secondary layer of silica which contains a different mix of dopants, referred to as the "cladding".

Light traveling through the core of the optical fiber is guided by total internal reflection due do index differences between the core and the cladding of the fiber. Proper mixing of dopants in the fiber core and cladding creates this index difference. Optical fiber that contains only one mode of the transmitted light is called "single mode" fiber, while fiber that allows a plurality of modes is called "multi-mode." Single mode fiber transmits data further, since it has less dispersion over distance than multi-mode fiber. Multi-mode fiber has a larger core diameter making alignment of fibers in an optical connector easier.

To couple one optical fiber to another with low loss of signal fidelity, it is necessary to properly align the cores, thereby allowing the light to be guided from one core into the next. To do this, an optical connector or mechanical splice is used. Typically, an optical connector includes a ferrule for holding optical fibers in precise positions. For two ferrules to be coupled, it is common for alignment pins to be used to guide and precisely position the fibers within each ferrule relative to its partner. In most applications, one of the ferrules is defined a male while the other is a female. This means that one of the ferrules would contain the precision pins, while the other would only contain the precision receptacles. This conventional approach either over or under constrains to determine the exact position of each fiber relative to its mate.

Over-constraining occurs when the alignment entities (pins in holes) interfere during engagement. After engagement, the relative position and orientation of the ferrules depends upon the averaged effect of elastic or plastic deformations that occur at the interface between the aligning entities. In order to achieve highly repeatable alignment, the aligning entities must be manufactured to stringent dimensional and geometric tolerances, which typically increases production costs. Despite the added costs and efforts, over-constrained systems still suffer from loss of signal fidelity associated with imperfections and mating misalignments.

The under-constrained state is one where the pins/holes combination is in clearance situation. In this case, the two ferrules align randomly within the clearance cross section. If there are any biasing forces, this will affect the location as well. Therefore, under-constrained systems typically suffer from loss of signal fidelity at the fiber-to-fiber interface. Note that it is common for over-constrained systems to wear down into under-constrained systems.

Due to the size of the optical fibers utilized, typically 125 micron ($10^{-6}$ meter) diameter with a 50 micron diameter core for a multi-mode fiber and 125 micron diameter with a 8.6–9.5 micron diameter for a single-mode fiber, it is critical to maintain precise tolerances of the ferrules. Any small manufacturing imperfection or mating misalignment leads to significant loss of signal fidelity at the fiber-to-fiber interface.

Many different ferrule designs have been proposed. For example, the MT ("Mechanical Transfer") ferrule developed by Nippon Telegraph and Telephone Corporation utilizes precision molded rectilinear glass-filled plastic housing to support an array of optical fibers in a ribbon cable. The MAC ("Multifiber Array Connector") connector developed by AT&T uses photolithographic techniques to precisely etch silicon chips with V-shaped grooves that are 250 microns center-to-center which hold the array of optical fibers of a ribbon cable. Various ferrule designs are disclosed in U.S. Pat. No. 5,416,868 entitled "Optical Connector Having A Resin Molding Portion Which Includes Opposite Opened Portions At Top And Bottom Surfaces", U.S. Pat. No. 6,168,317 entitled "Alignment Adapter For An Optical Connector And Method For Making Same", and U.S. Pat. No. 6,328,479 entitled "Multi-Terminator Optical Interconnect System", all of which are incorporated herein by reference. These existing ferrule designs, however, are either over-constrained or under-constrained and suffer from the disadvantages described above.

The inventors of the present invention have designed a ferrule that better accommodates imperfections and mating misalignments so that the loss of signal fidelity at the fiber-to-fiber interface is minimized. The ferrule designs described and claimed herein are the result of their efforts.

SUMMARY OF THE INVENTION

It is a general object of the invention to provide a ferrule design that accommodates imperfections and misalignments to provide accurate and repeatable optical coupling so that loss of data signals at the fiber-to-fiber interface is minimized.

This and other objects of the invention are achieved by a ferrule assembly, in a preferred embodiment, having a first ferrule, a second ferrule, and at least two alignment members to align the first and second ferrules during mating. The first ferrule, the second ferrule and the alignment members interact at the mating interface of the first and second ferrules to provide three constraint lines. In one embodiment, the first ferrule has a body with at least one channel for receiving at least one optical fiber. The first ferrule body includes a first surface portion for retaining a first alignment member and a second surface portion for retaining a second alignment member, the first and second surface portions being V-shaped. The second ferrule has a body with at least one channel for receiving at least one optical fiber. The second ferrule body includes a first surface portion for retaining the first alignment member and a second surface portion for retaining the second alignment member, the first surface portion being V-shaped and the second surface portion being flat.

DETAILED DESCRIPTION OF THE PREFERRED EMBODIMENTS

Figure 1:
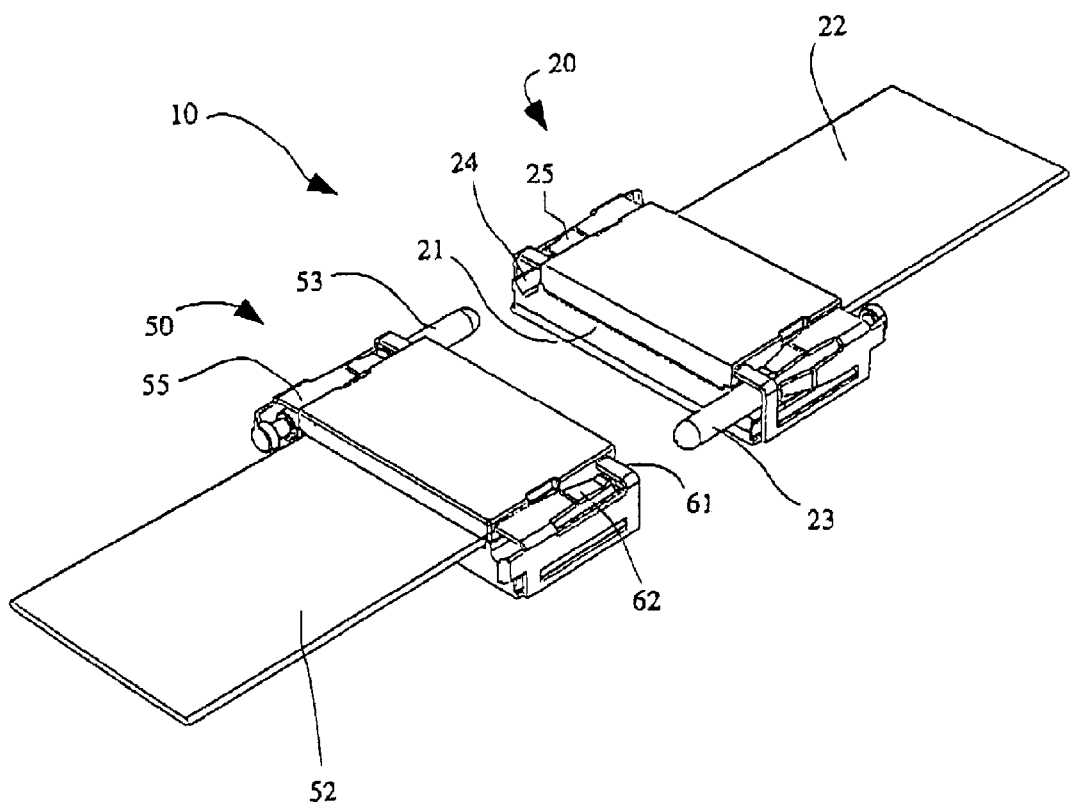
FIG. 1 is a perspective view of a preferred embodiment of a ferrule assembly of the present invention.
Figure 2A:
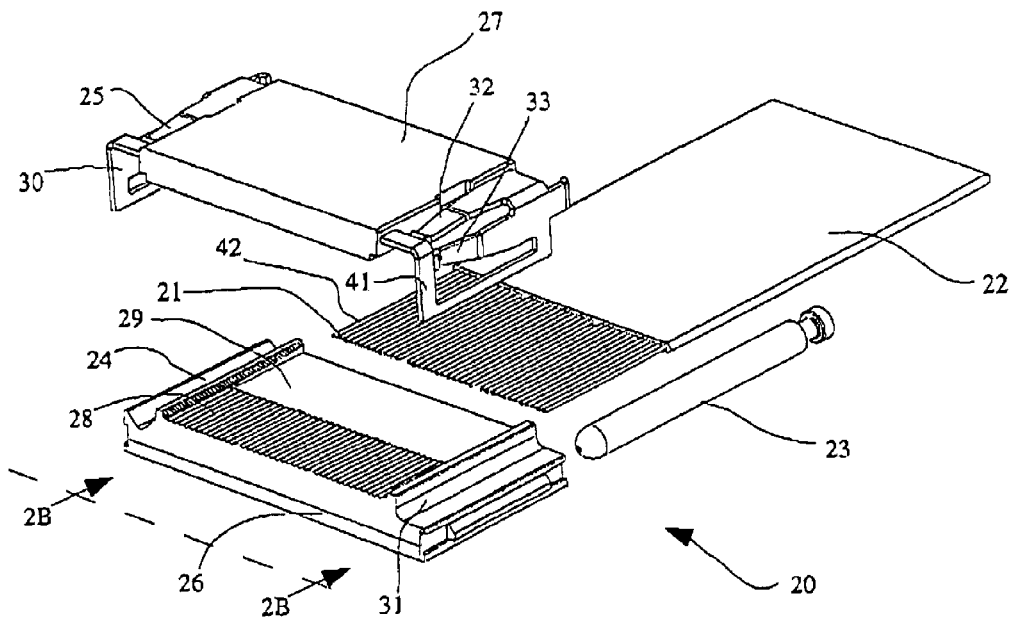
FIG. 2A shows one of the ferrule subassemblies of FIG. 1 in an exploded state.
Figure 4A:
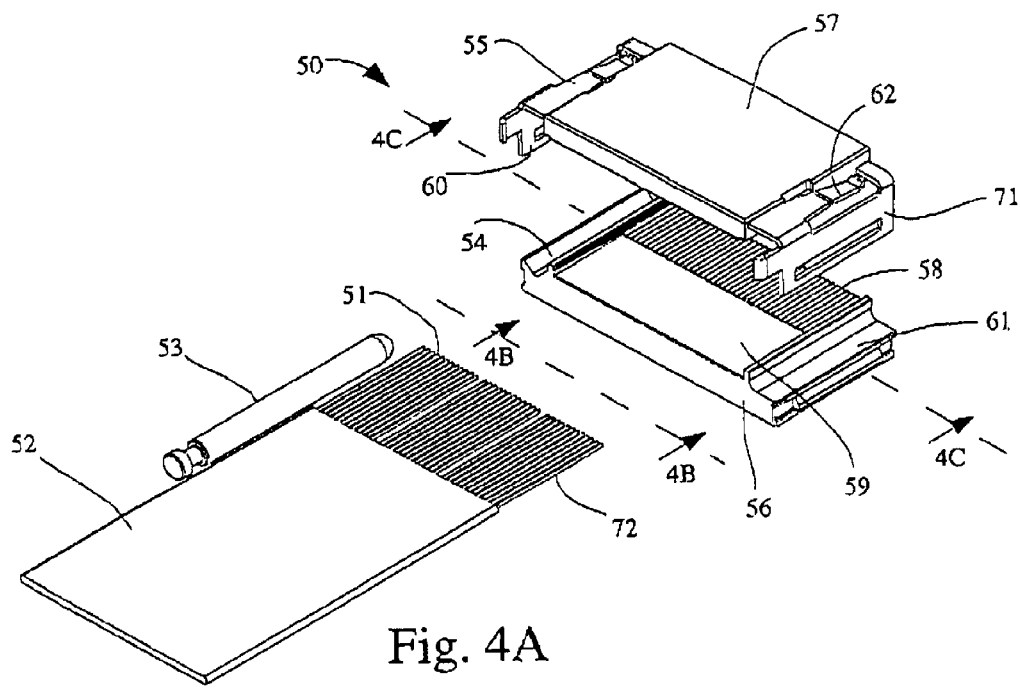
FIG. 4A shows the other of the ferrule subassemblies of FIG. 1 in an exploded state.

FIG. 1 is a perspective view of a preferred embodiment of a ferrule assembly of the present invention. The ferrule assembly 10 includes a first ferrule subassembly 20 holding a ribbon cable 22 of optical fibers and a second ferrule subassembly 50 holding a ribbon cable 52 of optical fibers. The ferrule assembly 10 aligns optical fiber end faces 21, 51 of optical fibers 42, 72 of the first and second ferrule subassemblies 20, 50. FIGS. 2A and 4A show optical fibers 42, 72 and FIG. 4A shows fiber end face 51.

The ferrule assembly of the present invention, which is described in greater detail below, preferably utilizes and incorporates principles of exact constraint, which suggest that when constraining the relative position and orientation of two bodies the number of rigid constraints should equal the quantity of restricted degrees of freedom. The term "exact constraint" suggests that the two bodies are neither over-constrained with too many constraints nor under-constrained with too few constraints. A detailed discussion of these principles is provided in a book entitled, "Exact Constraint: Machine Design Using Kinematic Principles," ASME Press, New York, 1999. A specific example of exact constraint principles are kinematic couplings which restrict all six degrees of freedom using six rigid constraints established by six points of contact between two bodies. A detailed discussion of kinematic couplings can be found in a book entitled, "Precision Machine Design," by Alexander H. Slocum, Prentice-Hall, Englewood Cliffs, N.J., 1992, which is incorporated herein by reference.

In U.S. application Ser. No. 09/711,333 filed on Nov. 9, 2000 and entitled, "Methods and Apparatus for Forming a Fiber Optic Connection", which is incorporated herein by reference, kinematic coupling concepts are disclosed. A limitation of the fiber optic connector design disclosed in that application (assigned to the same assignee as for the present application) is the need for mating optical fibers to be in "near" contact. This means that for conventional optical fibers, there can be no more than a very small (e.g., 50 nanometer) air gap between fiber endfaces, or an index matching gel must be applied. If the fiber endfaces are actually in physical contact, however, the kinematic concepts are no longer applicable. Thus, maintaining the very small air gap between the fiber endfaces allows for kinematic concepts to be applied as desired, but such a design may be difficult from a manufacturing standpoint.

As known, exact constraint concepts generally concern the observation that physical bodies (e.g., fiber optic connectors) have six degrees of freedom ("DOF") relative to each other, regardless of the coordinate system used (e.g., Cartesian, spherical, cylindrical). For example, in the Cartesian coordinate system, the six DOF are linear (or lateral) movement in each of the X, Y and Z axes as well as rotational around each of the X, Y and Z axes. In the present invention, three critical degrees of freedom that impact signal fidelity are translations and rotation within the plane where the array of fibers is mated. Hence, this invention establishes three constraints that align the ferrules so that only these 3 degrees of freedom are restricted and hence exactly constrained.

Referring back to FIG. 1, the first ferrule subassembly 20 is generally shown as having a first alignment pin 23 which is received by the second ferrule subassembly 50 in alignment surface 61. Biasing member 62 biases the first alignment pin 23 against the surface 61. The second ferrule subassembly 50 is generally shown as having a second alignment pin 53 which is received by the first ferrule subassembly 20 in alignment surface 24. Biasing member 25 biases the second alignment pin 53 against the surface 24.

Referring to FIG. 2A, the first ferrule subassembly 20 is shown in an exploded state, generally shown as having a bottom portion 26 and a top portion 27. While the preferred embodiment of the first ferrule subassembly 20 shows it to be made of separate portions, it would be apparent to one of ordinary skill in the art that the first ferrule subassembly 20 could also be a single monolithic piece or multiple pieces. The bottom portion 26 includes a plurality of substantially V-shaped grooves 28 on the side 29 facing the top portion 27. These grooves 28 are configured to receive optical fibers 42. As shown in FIG. 1, the optical fibers 42 are protected in the ribbon cable 22.

Preferably, the top portion 27 is made from a relatively flexible material, such as plastic, while the bottom portion 26 is made from a rigid material, such as metal. However, if the top portion 27 is also made from a rigid material, then it should be kept very flat. A relatively flexible top portion combined with rigid bottom portion aids in the retention of the optical fibers 42 therebetween, by allowing the rigid portion to principally regulate the position of the fibers.

The side 29 of the bottom portion 26 facing the top portion 27 has a surface portion 31 for retaining the first alignment pin 23. Biasing members 32, 33 of a spring member 41 biases the first alignment pin 23 against the surface portion 31. The spring member 41 is preferably a spring clip. The side 29 of the bottom portion 26 also has the surface portion 24 for retaining the second alignment pin 53. Biasing member 25 biases the second alignment pin 53 against the surface portion 24. Further description of the retention of the alignment pins will be given with respect to FIG. 2B, which is an end view of the first ferrule subassembly 20 along lines 2B—2B of FIG. 2A.

Figure 2B:
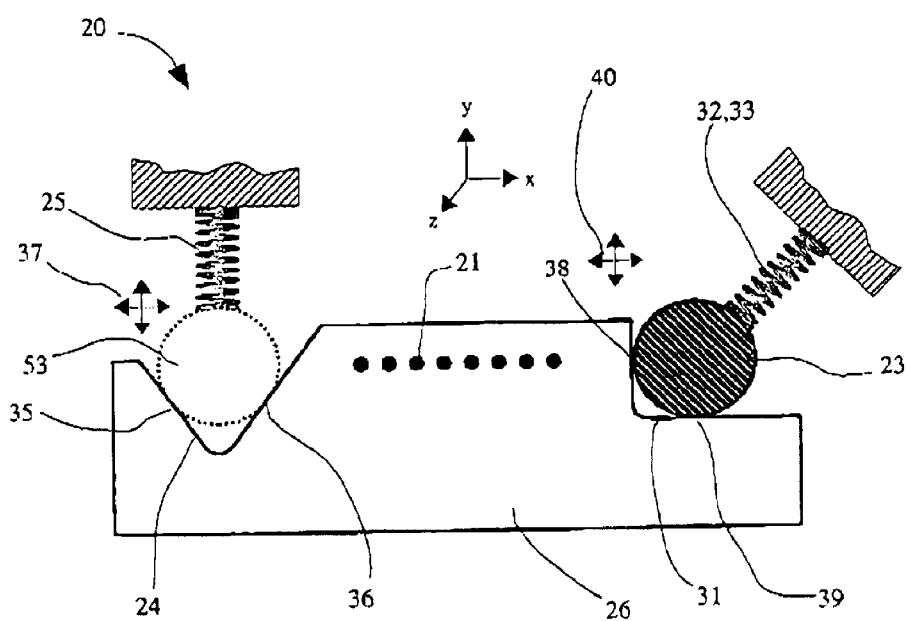
FIG. 2B is an end view along lines 2B—2B of the ferrule subassembly of FIG. 2A (not exploded)

FIG. 2B shows the first alignment pin 23 preloaded into the substantially V-shaped surface portion 31 by the biasing members 32, 33. The first alignment pin 23 makes contact at points 38 and 39 of the surface portion 31. It should be understood that these points of contact 38, 39 are only from the view point of FIG. 2B, and are actually lines of contact along the surface portion 31. Biasing members 32, 33 are shown schematically as a coil spring providing a net biasing force approximately along the centerline of the V-shaped surface portion 31. The first alignment pin 23 is fully constrained from X-Y motion, shown by arrows 40, to the first ferrule subassembly 20.

Once the first alignment pin 23 is constrained to the ferrule, it becomes an integral part of the first ferrule subassembly 20. The second alignment pin 53 from the second ferrule subassembly 50 is shown in FIG. 2B for illustration purposes only. The relationship between the second alignment pin 53, which is fully constrained or integral to the second ferrule subassembly 50, and the first ferrule subassembly 20 is determined by the substantially V-shaped surface portion 24 of the bottom portion 26. The biasing member 25 biases the second alignment pin 53 against the substantially V-shaped surface portion 24 at points 35 and 36 to fully constrain the pin 53 from X-Y motion, as indicated by arrows 37. It should be understood that these points of contact 35, 36 are only from the view point of FIG. 2B, and are actually lines of contact along the surface portion 24. Because both alignment pins, pin 23 of ferrule subassembly 20 and pin 53 of ferrule subassembly 50, are fully constrained to ferrule subassembly 20 when assembled, the first ferrule subassembly 20 is referred to herein as the independent ferrule subassembly.

Referring to FIG. 4A, the second ferrule subassembly 50 is shown in an exploded state, generally shown as having a bottom portion 56 and a top portion 57. While the preferred embodiment of the second ferrule subassembly 50 shows it to be made from separate pieces, it would be apparent to one of ordinary skill in the art that the second ferrule subassembly 50 could also be a single monolithic piece or multiple pieces. The bottom portion 56 includes a plurality of substantially V-shaped grooves 58 on the side 59 facing the top portion 57. These grooves 58 are configured to receive optical fibers 72. As shown in FIG. 1, the optical fibers 72 are protected in the ribbon cable 52.

Preferably, the top portion 57 is made from a relatively flexible material, such as plastic, while the bottom portion 56 is made from a rigid material, such as metal. However, if the top portion 57 is also made from a rigid material, then it should be kept very flat. A relatively flexible top portion combined with rigid bottom portion aids in the retention of the optical fibers 72 therebetween, by allowing the rigid portion to principally regulate the position of the fibers.

The side 59 of the bottom portion 56 facing the top portion 57 has a surface portion 54 for retaining the second alignment pin 53. Biasing member 55 of a spring member 60 biases the second alignment pin 53 against the surface portion 54. The spring member 60 is preferably a spring clip. The side 59 of the bottom portion 56 also has the surface portion 61 for retaining the first alignment pin 23 from the first ferrule subassembly 20. The biasing member 62 biases the first alignment pin 23 against the surface portion 61. Further description of the retention of the alignment pins will be given with respect to FIG. 4B, which is an end view of the second ferrule subassembly 50 along lines 4B—4B of FIG. 4A.

Figure 4B:
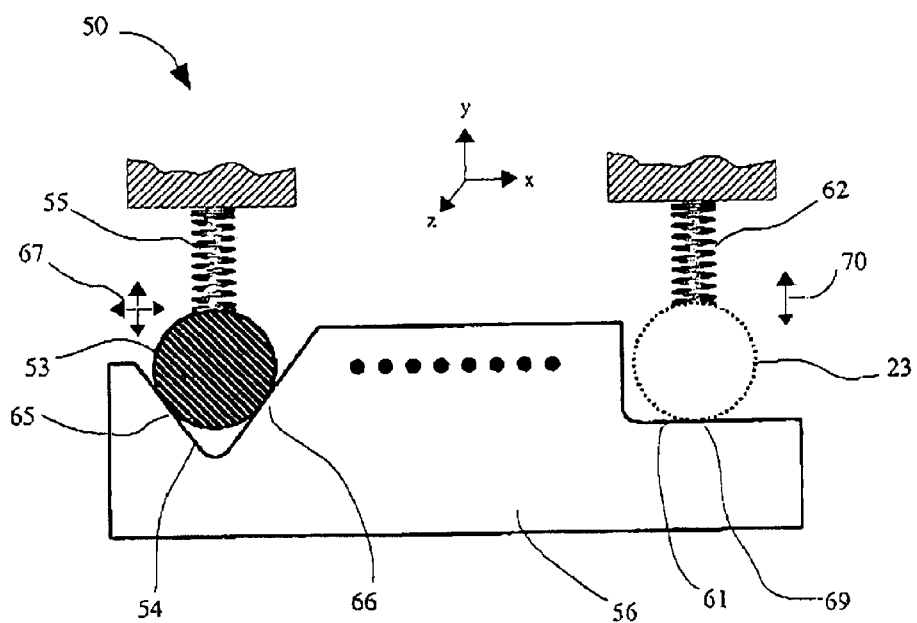
FIG. 4B is an end view along lines 4B—4B of the ferrule subassembly of FIG. 4A (not exploded)

FIG. 4B shows the second alignment pin 53 preloaded into the substantially V-shaped surface portion 54 by the biasing member 55. The second alignment pin 53 makes contact at points 65 and 66 of the surface portion 54. It should be understood that these points of contact 65, 66 are only from the view point of FIG. 4B, and are actually lines of contact along the surface portion 54. The biasing member 55 is shown schematically as a coil spring providing a net biasing force approximately along the centerline of the V-shaped surface portion 54. The second alignment pin 53 is fully constrained from X-Y motion, as indicated by arrows 67, to the second ferrule subassembly 50.

Figure 3A:
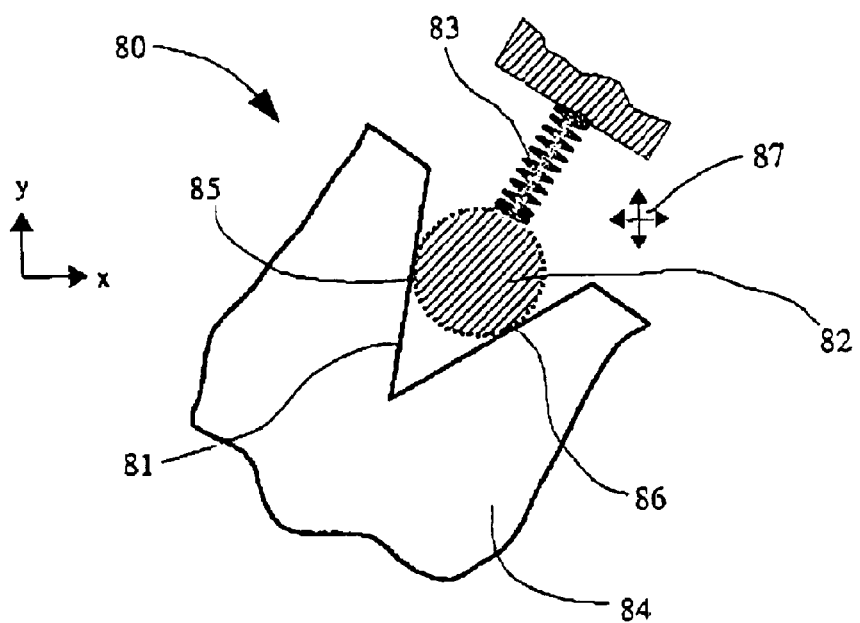
FIG. 3A is a partial end view of a ferrule subassembly showing a V-shaped surface portion.
Figure 3B:
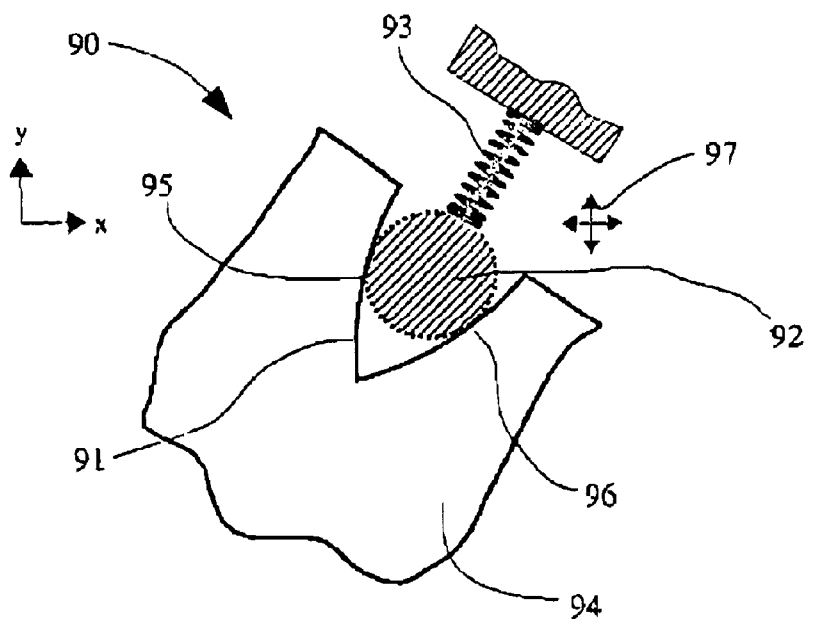
FIG. 3B is the same as FIG. 3a, with the V-shaped surface portion being a "Gothic arch" style V-shape.

In the preferred embodiment of FIG. 1, each alignment pin is fixed to each ferrule subassembly using a V-shaped surface portion and a biasing member, as further explained in FIG. 3A generally. An alignment pin 82 in a V-shaped surface portion 81 provides exact constraint, as indicated by arrows 87, in two linear degrees of freedom (X and Y) by a biasing force 83 generally normal to the centerline of the V-shaped surface portion 81. The alignment pin 82 makes contact with the surface portion 81 of a body 84 at two points of contact 85, 86. Similarly, FIG. 3B illustrates an alignment pin 92 in a V-shaped surface portion 91 where the surfaces are curved. As indicated by arrows 97, the alignment pin 92 in the surface portion 91 provides exact constraint in two linear degrees of freedom (X and Y) by a biasing force 93 generally normal to the centerline of the surface portion 91. The alignment pin 92 makes contact with the surface portion 91 of a body 94 at two points of contact 95, 96. In this embodiment (as opposed to FIG. 3A), the stress at the contact points 95, 96 between the pin 92 and the body 94 is reduced and stiffness is increased by the curved surfaces.

As defined herein, a "V-shaped" or a "substantially V-shaped" surface portion provides two surfaces, where an alignment member makes contact along one line of contact on each of the two surfaces when biased by a biasing member against the surface portion. Note that a surface portion which has more than two surfaces, but only two surfaces of which make contact along a line of contact with an alignment member, is included under the definition of "V-shaped" surface portion.

Once the second alignment pin 53 is constrained to the bottom portion 56, it becomes an integral part of the second ferrule subassembly 50. The first alignment pin 23 from the first ferrule subassembly 20 is shown in FIG. 4B for illustration purposes only. The relationship between the first alignment pin 23, which is fully constrained or integral to the first ferrule subassembly 20, and the second ferrule subassembly 50 is determined by the flat surface portion 61. The biasing member 62 biases the first alignment pin 23 against the flat surface portion 61 such that the pin 23 makes contact with the surface portion 61 at point 69. It should be understood that this point of contact is only from the view point of FIG. 4B, and is actually a line of contact along the surface portion 61. The first alignment pin 23 is only constrained in the linear Y-axis degree of freedom, as indicated by arrow 70. The second ferrule subassembly 50 is referred to as the dependant ferrule subassembly, and the relationship between the dependant and independent ferrule subassemblies at mate is an exact constraint system as illustrated in FIG. 4C.

As defined herein, a "flat" or a "substantially flat" surface portion provides only one surface which makes contact with an alignment member along one line of contact when the alignment member is biased by a biasing member against the surface portion. Note that a surface portion which has more than one surface, but only one surface of which makes contact along a line of contact with an alignment member, is included under the definition of "flat" surface portion.

Figure 4C:
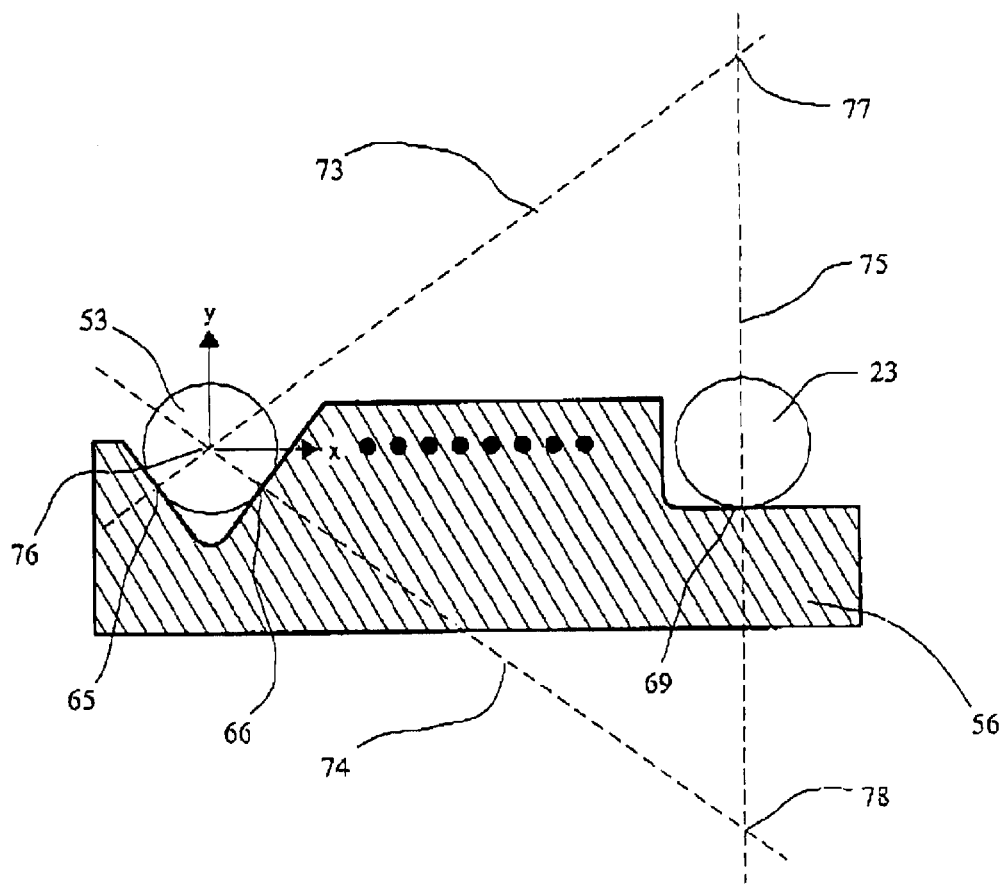
FIG. 4C is a cross-sectional view along lines 4C—4C of the ferrule subassembly of FIG. 4A (not exploded) after mating.

FIG. 4C illustrates a cross-sectional view along lines 4C—4C of FIG. 4A of the dependant ferrule subassembly 50 after mating with the independent ferrule subassembly 20. The alignment pins 23, 53 make contact at three points 65, 66, 69 on the surface portions 61, 54 of the dependent ferrule subassembly 50. In accordance with the laws of contact physics, each point of contact provides a constraining force potential normal (i.e., perpendicular) to the surface of contact. Thus, contact point 65 has a constraint line 73, contact point 66 has a constraint line 74, and contact point 69 has a constraint line 75. Within the plane of the fiber-to-fiber interface, there are three degrees of freedom that must be constrained to prevent relative motion between the ferrule subassembly 20 and the ferrule subassembly 50. The principles of exact constraint require that there be no more or no less unique constraints than the degrees of freedom required. The system of three constraints illustrated by constraint lines 73, 74, 75 intersecting at three distinct points 76, 77, 78 works to exactly constrain the three degrees of freedom in the plane between the ferrule subassemblies 20, 50. Cases of more constraint lines than three in the plane between the ferrule subassemblies are considered over-constrained and less than three constraint lines would be considered under-constrained. While the number of constraint line intersections must be generally three, the inventors of the present invention have identified at least one case where the number of constraint line intersections is two. This case will be discussed in some detail later.

Figure 5:
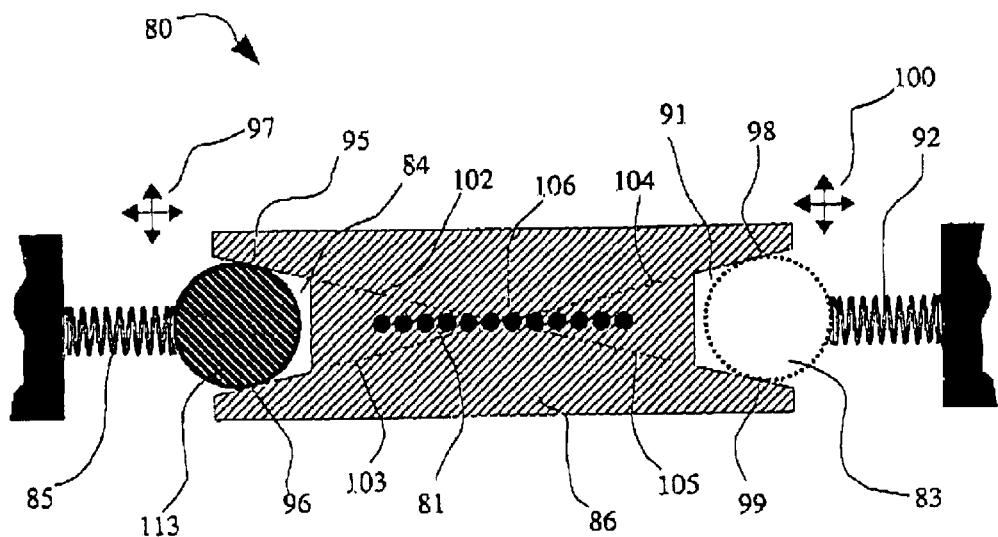
FIG. 5 shows a cross-sectional view of an alternate independent ferrule subassembly.

FIG. 5 shows a cross-sectional view of an alternate independent ferrule subassembly 80 for aligning fiber end faces 81, which fully constrains an alignment pin 113 in a V-shaped surface portion 84 of a ferrule body 86. The full constraint, as indicated by arrows 97, is achieved by biasing the alignment pin 113 against the surface portion 84 using a biasing member 85 to provide points of contact 95, 96. As discussed above with respect to FIGS. 2B and 4B, while the biasing member 85 is shown in FIG. 5 as a coil spring, the biasing member may take any configuration to provide the necessary bias.

Figure 6:
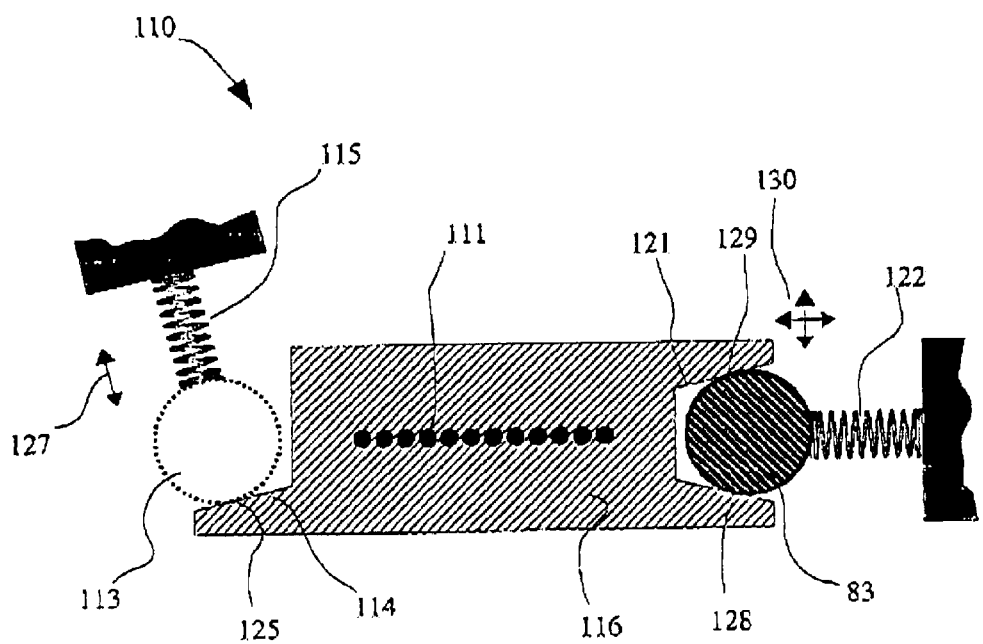
FIG. 6 shows a cross-sectional view of an alternate dependent ferrule subassembly mateable to the independent ferrule subassembly of FIG. 5.

An alignment pin 83 from a mating ferrule subassembly 110, which is shown in FIG. 6, is fully constrained in a V-shaped surface portion 91 of the ferrule body 86. The full constraint, as indicated by arrows 100, is achieved by biasing the alignment pin 83 against the surface portion 91 using a biasing member 92 to provide points of contact 98, 99. While the biasing member 92 is shown as a coil spring, the biasing member may take any configuration to provide the necessary bias. The inventors believe that this embodiment is unique in that the intersection 106 of lines 102, 103, 104, 105, which extend from the V-shaped surface portions 84, 91, is at the center of the plurality of optical fibers 81 and represents the center of thermal expansion for the ferrule subassembly 80. This configuration of the center of thermal expansion allows the minimizing of displacement errors induced from temperature changes.

FIG. 6 shows a cross-sectional view of an alternate dependent ferrule subassembly 110 for aligning fiber end faces 111 to the fiber end faces 81 of the independent ferrule subassembly 80. The dependent ferrule subassembly 110 fully constrains the alignment pin 83 in a V-shaped surface portion 121 of a ferrule body 116. The full constraint, as indicated by arrows 130, is achieved by biasing the alignment pin 83 against the surface portion 121 using a biasing member 122 to provide points of contact 128, 129. While the biasing member 122 is shown in FIG. 6 as a coil spring, the biasing member may take any configuration to provide the necessary bias. The alignment pin 113 from the mating ferrule subassembly 80 is constrained, as indicated by arrow 127, against a flat surface portion 114. This constraint is achieved by biasing the alignment pin 113 against the flat surface portion 114 using a biasing member 115 to provide a point of contact 125. While the biasing member 115 is shown in FIG. 6 as a coil spring, the biasing member may take any configuration to provide the necessary bias.

Figure 6A:
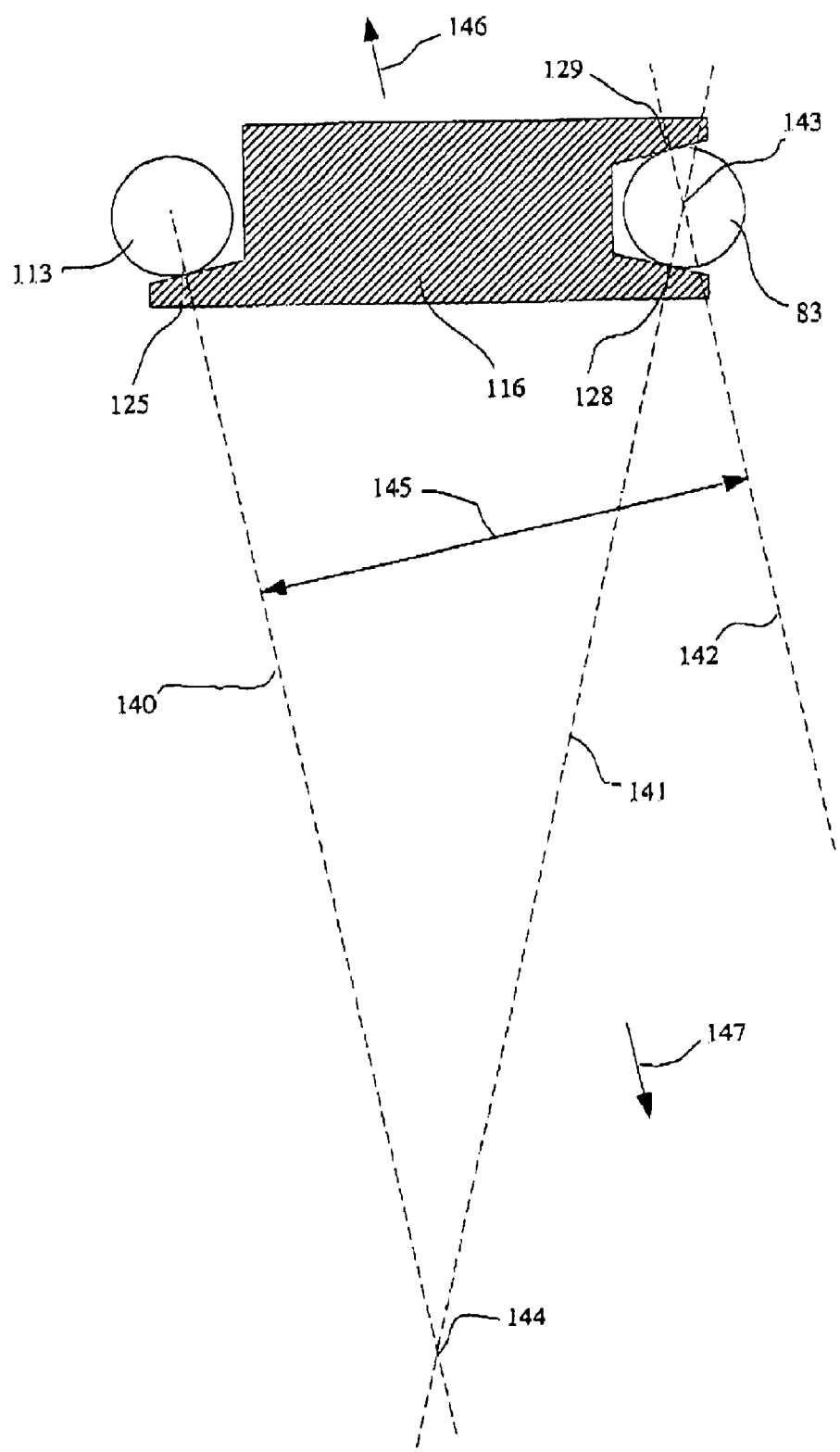
FIG. 6A is a schematic representation of constraint lines at the fiber-to-fiber mating interface, with respect to the dependent ferrule subassembly of FIG. 6.

The pattern of constraint lines at the fiber-to-fiber mating interface when the ferrule subassemblies 80, 110 are mated is presented schematically in FIG. 6A, with respect to the dependant ferrule subassembly 110. Contact points 125, 128, 129 between alignment pins 113, 83 and the surface portions 114, 121 serve to constrain the ferrule subassemblies 80, 110 along constraint lines 140, 141, 142, which intersect at points 143, 144. Therefore, the assembly of ferrule subassemblies 80, 110 is exactly constrained in the plane of the mating interface. Because the two parallel constraint lines 140, 142 are offset a significant distance represented by reference numeral 145 (in this case, almost the entire width of the ferrule body 116), they represent unique constraints. Note that in fact, because truly parallel lines are practically impossible to manufacture, constraint lines 140, 142 do eventually intersect off in space in either of directions 146 or 147.

Figure 7:
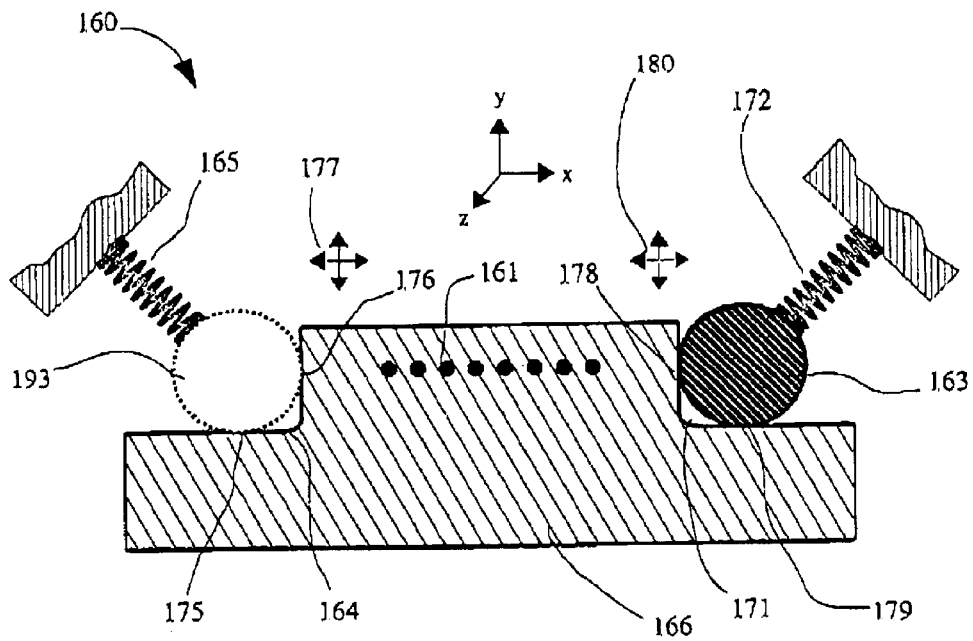
FIG. 7 shows a cross-sectional view of another independent ferrule subassembly embodiment.

FIG. 7 shows a cross-sectional view of still alternate independent ferrule subassembly 160 for aligning fiber end faces 161, which fully constrains an alignment pin 163 in a V-shaped surface portion 171 of a ferrule body 166. The full constraint, as indicated by arrows 180, is achieved by biasing the alignment pin 163 against the surface portion 171 using a biasing member 172 to provide points of contact 178, 179. While the biasing member 172 is shown in FIG. 7 as a coil spring, the biasing member may take any configuration to provide the necessary bias.

Figure 8:
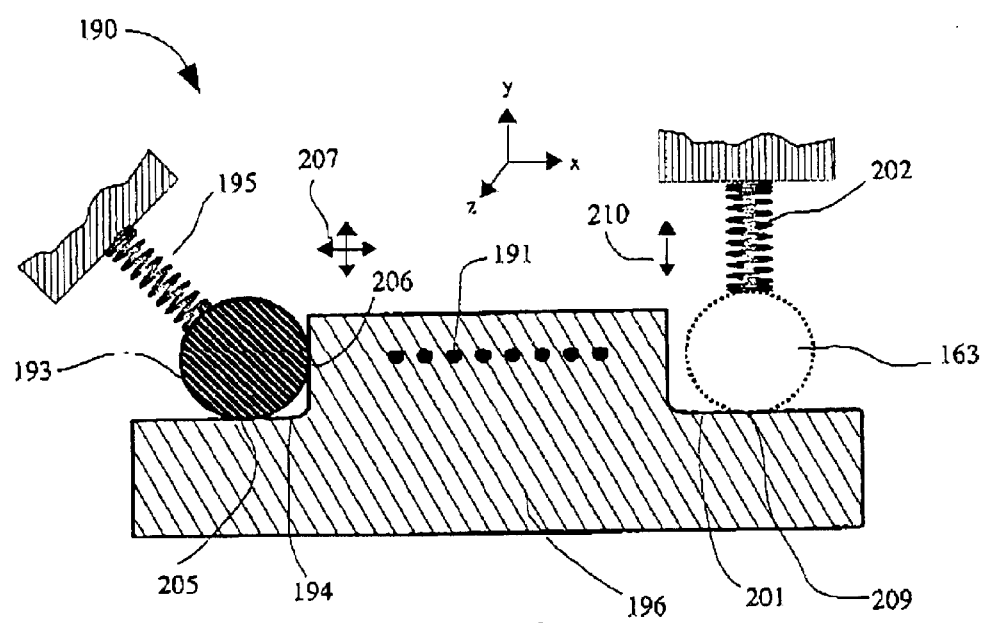
FIG. 8 shows a cross-sectional view of another alternate dependent ferrule subassembly mateable to the independent ferrule subassembly of FIG. 7.

An alignment pin 193 from a mating ferrule subassembly 190, which is shown in FIG. 8, is fully constrained in a V-shaped surface portion 164 of the ferrule body 166. The full constraint, as indicated by arrows 177, is achieved by biasing the alignment pin 193 against the surface portion 164 using a biasing member 165 to provide points of contact 175, 176. While the biasing member 165 is shown as a coil spring, the biasing member may take any configuration to provide the necessary bias.

FIG. 8 shows a cross-sectional view of an alternate dependent ferrule subassembly 190 for aligning fiber end faces 191 to the fiber end faces 161 of the independent ferrule subassembly 160. The dependent ferrule subassembly 190 fully constrains the alignment pin 193 in a V-shaped surface portion 194 of a ferrule body 196. The full constraint, as indicated by arrows 207, is achieved by biasing the alignment pin 193 against the surface portion 194 using a biasing member 195 to provide points of contact 205, 206. While the biasing member 195 is shown in FIG. 8 as a coil spring, the biasing member may take any configuration to provide the necessary bias. The alignment pin 163 from the mating ferrule subassembly 160 is constrained, as indicated by arrow 210, against a flat surface portion 201. This constraint is achieved by biasing the alignment pin 163 against the flat surface portion 201 using a biasing member 202 to provide a point of contact 209. While the biasing member 202 is shown in FIG. 8 as a coil spring, the biasing member may take any configuration to provide the necessary bias.

Figure 8A:
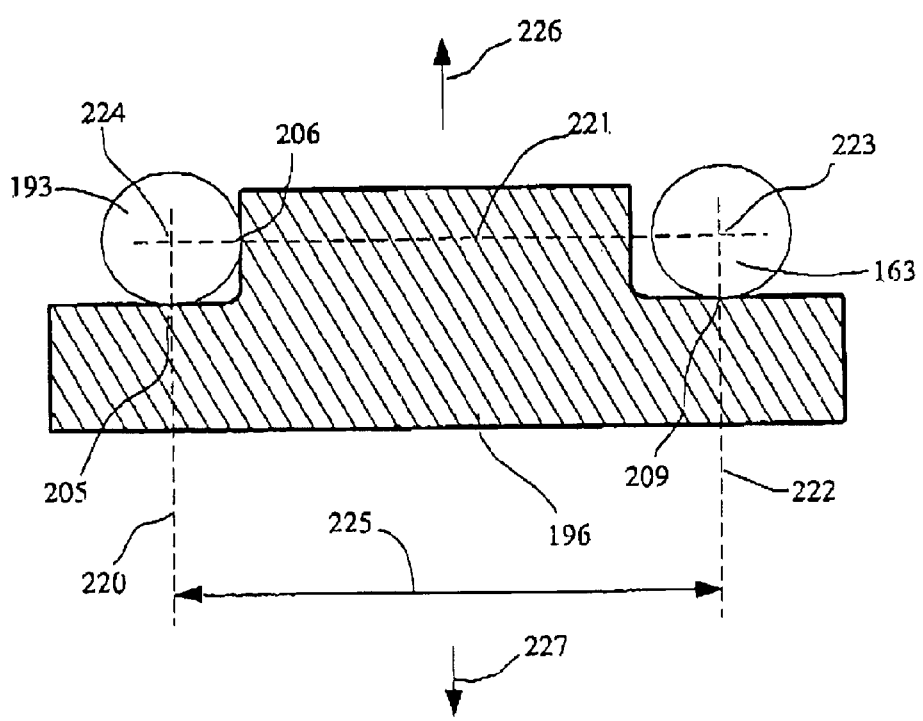
FIG. 8A is a schematic representation of constraint lines at the fiber-to-fiber mating interface, with respect to the dependent ferrule subassembly of FIG. 8.

The pattern of constraint lines at the fiber-to-fiber mating interface when the ferrule subassemblies 160, 190 are mated is presented schematically in FIG. 8A, with respect to the dependant ferrule subassembly 190. Contact points 205, 206, 209 between alignment pins 193, 163 and the surface portions 194, 201 serve to constrain the ferrule subassemblies 160, 190 along constraint lines 220, 221, 222, which intersect at points 224, 223. Therefore, the assembly of ferrule subassemblies 160, 190 is exactly constrained in the plane of the mating interface. Because the two parallel constraint lines 220, 222 are offset a significant distance represented by reference numeral 225 (in this case, almost the entire width of the ferrule body 196), they represent unique constraints. Note that in fact, because truly parallel lines are practically impossible to manufacture, constraint lines 220, 222 do eventually intersect off in space in either of directions 226 or 227.

Figure 9:
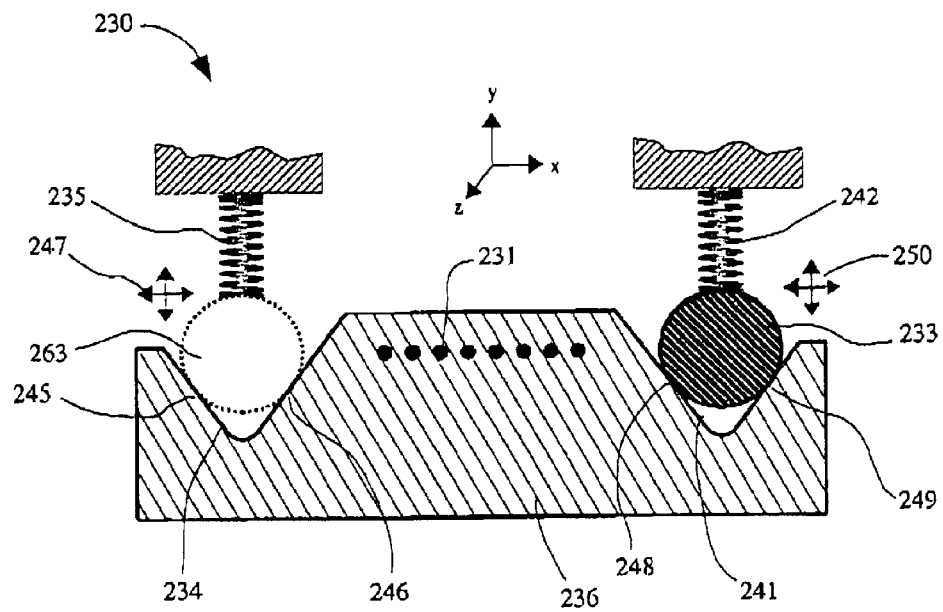
FIG. 9 shows a cross-sectional view of another independent ferrule subassembly embodiment.

FIG. 9 shows a cross-sectional view of yet alternate independent ferrule subassembly 230 for aligning fiber end faces 231, which fully constrains an alignment pin 233 in a V-shaped surface portion 241 of a ferrule body 236. The full constraint, as indicated by arrows 250, is achieved by biasing the alignment pin 233 against the surface portion 241 using a biasing member 242 to provide points of contact 248, 249. While the biasing member 242 is shown in FIG. 9 as a coil spring, the biasing member may take any configuration to provide the necessary bias.

Figure 10:
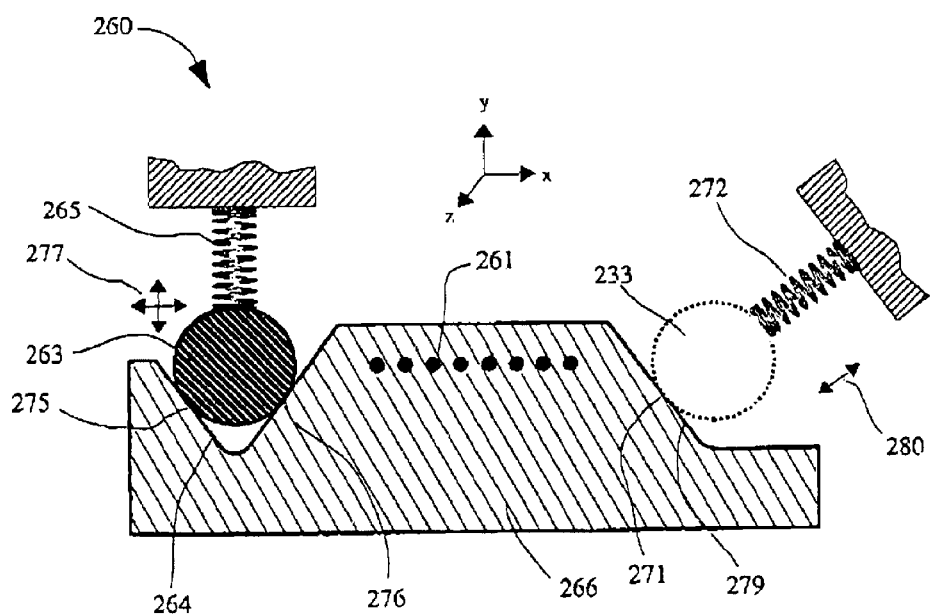
FIG. 10 shows a cross-sectional view of another alternate dependent ferrule subassembly mateable to the independent ferrule subassembly of FIG. 9.

An alignment pin 263 from a mating ferrule subassembly 260, which is shown in FIG. 10, is fully constrained in a V-shaped surface portion 234 of the ferrule body 236. The full constraint, as indicated by arrows 247, is achieved by biasing the alignment pin 263 against the surface portion 234 using a biasing member 235 to provide points of contact 245, 246. While the biasing member 235 is shown as a coil spring, the biasing member may take any configuration to provide the necessary bias.

FIG. 10 shows a cross-sectional view of an alternate dependent ferrule subassembly 260 for aligning fiber end faces 261 to the fiber end faces 231 of the independent ferrule subassembly 230. The dependent ferrule subassembly 260 fully constrains the alignment pin 263 in a V-shaped surface portion 264 of a ferrule body 266. The full constraint, as indicated by arrows 277, is achieved by biasing the alignment pin 263 against the surface portion 264 using a biasing member 265 to provide points of contact 275, 276. While the biasing member 265 is shown in FIG. 10 as a coil spring, the biasing member may take any configuration to provide the necessary bias. The alignment pin 233 from the mating ferrule subassembly 230 is constrained, as indicated by arrow 280, against a flat surface portion 279. This constraint is achieved by biasing the alignment pin 233 against the flat surface portion 279 using a biasing member 272 to provide a point of contact 271. While the biasing member 272 is shown in FIG. 10 as a coil spring, the biasing member may take any configuration to provide the necessary bias.

Figure 10A:
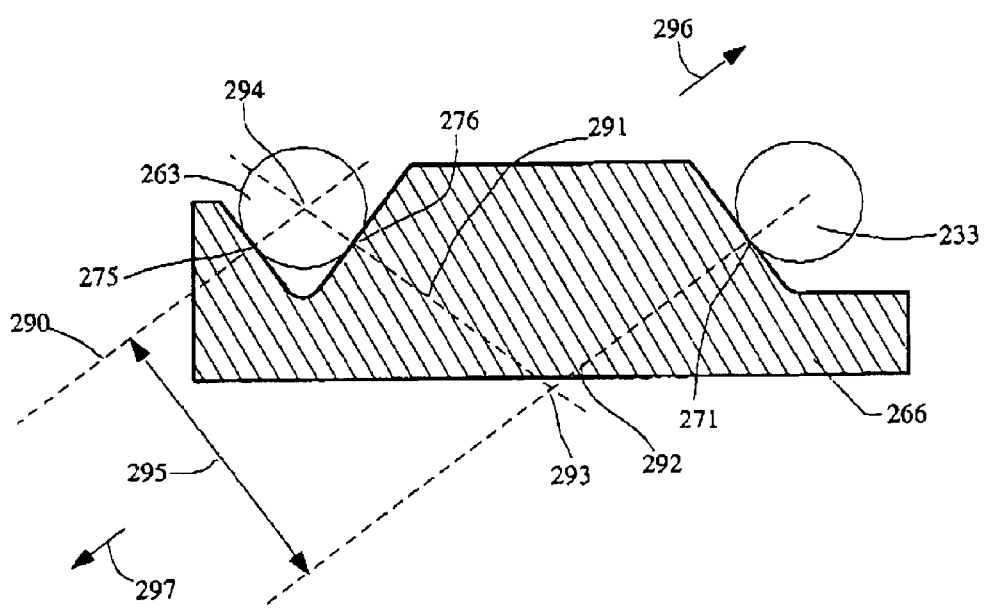
FIG. 10A is a schematic representation of constraint lines at the fiber-to-fiber mating interface, with respect to the dependent ferrule subassembly of FIG. 10.

The pattern of constraint lines at the fiber-to-fiber mating interface when the ferrule subassemblies 230, 260 are mated is presented schematically in FIG. 10A, with respect to the dependant ferrule subassembly 260. Contact points 275, 276, 271 between alignment pins 263, 233 and the surface portions 264, 279 serve to constrain the ferrule subassemblies 230, 260 along constraint lines 290, 291, 292, which intersect at points 294, 293. Therefore, the assembly of ferrule subassemblies 230, 260 is exactly constrained in the plane of the mating interface. Because the two parallel constraint lines 290, 292 are offset a significant distance represented by reference numeral 295, they represent unique constraints. Note that in fact, because truly parallel lines are practically impossible to manufacture, constraint lines 290, 292 do eventually intersect off in space in either of directions 296 or 297.

Figure 11:
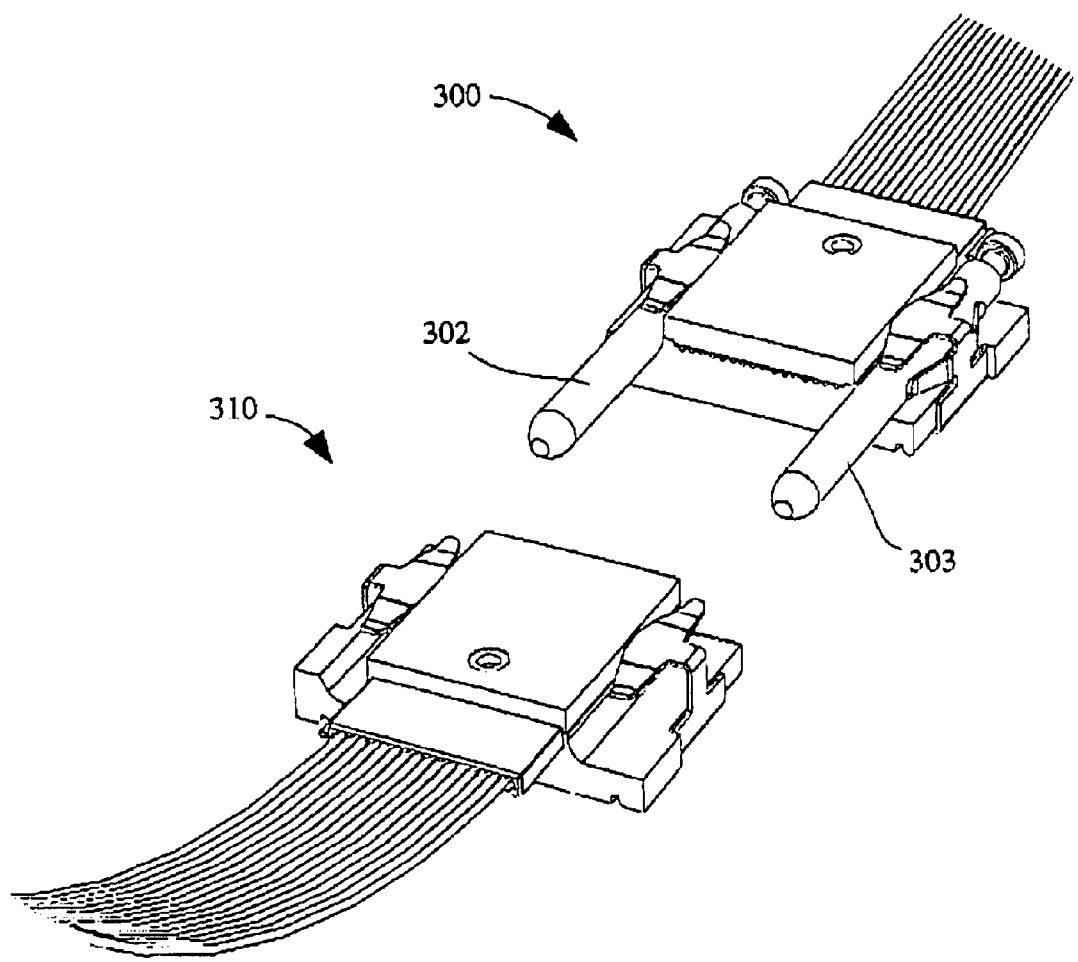
FIG. 11 represents an alternate configuration of a ferrule assembly where alignment pins are located in only one of the ferrule subassemblies.

The placement of a first alignment pin in the independent ferrule subassembly and a second alignment pin in the dependant ferrule subassembly as described heretofore is only one of the possible configurations. FIG. 11 represents an alternate configuration where both alignment pins 302, 303 are located in the independent ferrule subassembly 300 and no alignment pins are in the dependent ferrule subassembly 310. Yet another alternate configuration (not shown) would be to have the alignment pins not assembled to either ferrule subassembly and inserted simultaneously during mating of the ferrule subassemblies. While the preferred embodiment of each ferrule subassembly is an assembly of two component pieces and a removable cylindrical alignment pin, it would be apparent to one of ordinary skill in the art that other ferrule subassembly configurations and alignment pin configurations may be utilized as well.

Figure 12:
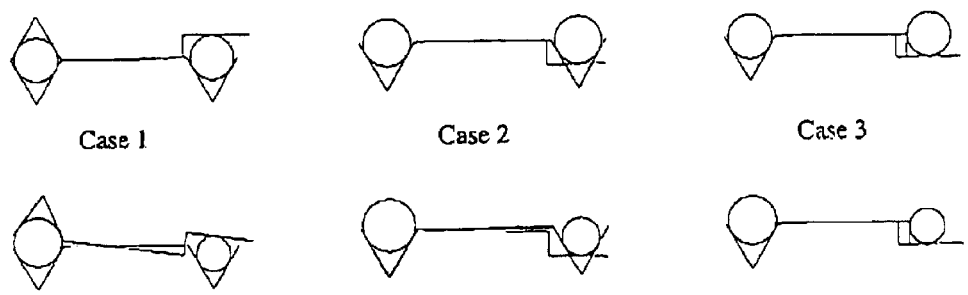
FIG. 12 illustrates three different ferrule assembly configurations to demonstrate how one imperfection may affect the performance of a ferrule assembly.

FIG. 12 illustrates how one potential imperfection may affect the performance of an optical connector ferrule assembly. In this figure, sensitivity to alignment pin diameter discrepancies is shown for different ferrule designs. Case 1 illustrates a first ferrule (e.g., independent ferrule) having two substantially V-shaped grooves in a vertical orientation for retaining alignment pins and a second, mating ferrule (e.g., dependant ferrule) having one substantially V-shaped groove in a vertical orientation and one flat surface in a mirrored orientation. In this case, alignment pin diameter discrepancy has a high level of correlation to ferrule-to-ferrule misalignment.

Case 2 illustrates a first ferrule (e.g., independent ferrule) having two substantially V-shaped grooves in a vertical orientation for retaining alignment pins and a second, mating ferrule (e.g., dependant ferrule) having one substantially V-shaped groove and one flat surface in a non-mirrored orientation. While this case is not as problematic as case 1 for alignment pin diameter discrepancy, it nonetheless could cause significant loss of signal fidelity across the ferrule-to-ferrule interface. A small rotation between the two ferrules results when the second pin with smaller diameter sets deeper in the V-shaped groove.

Case 3, which is the preferred embodiment of the present invention, illustrates a first ferrule having one substantially V-shaped groove in vertical orientation for retaining a first alignment pin and one substantially V-shaped groove in a 45 degree orientation for retaining a second alignment pin. A second, mating ferrule also has one substantially V-shaped groove in a vertical orientation for retaining the first alignment pin and one flat surface for retaining the second alignment pin in a non-mirrored orientation. As shown, this case best accommodates alignment pin diameter discrepancy and thus, minimizes loss of signal fidelity across the ferrule-to-ferrule interface.

Figure 13:
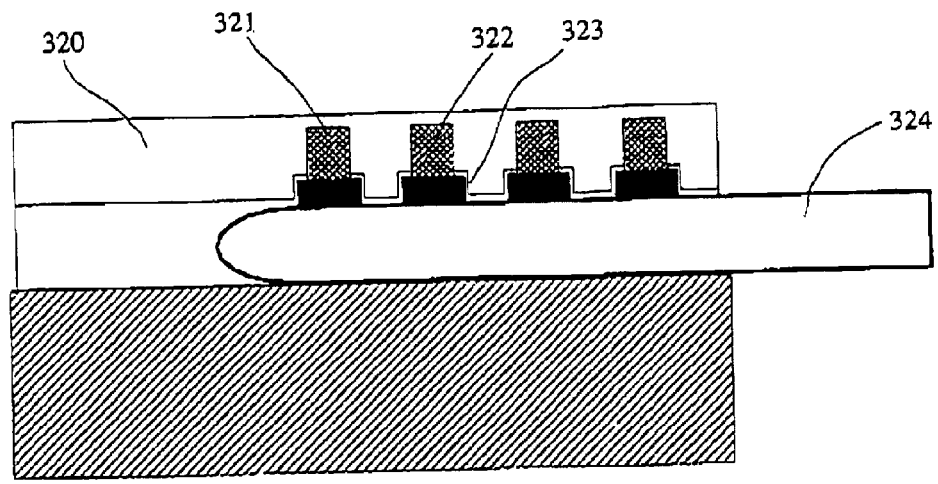
FIG. 13 illustrates an alternate embodiment for retaining an alignment pin in a groove of a ferrule.
Figure 14:
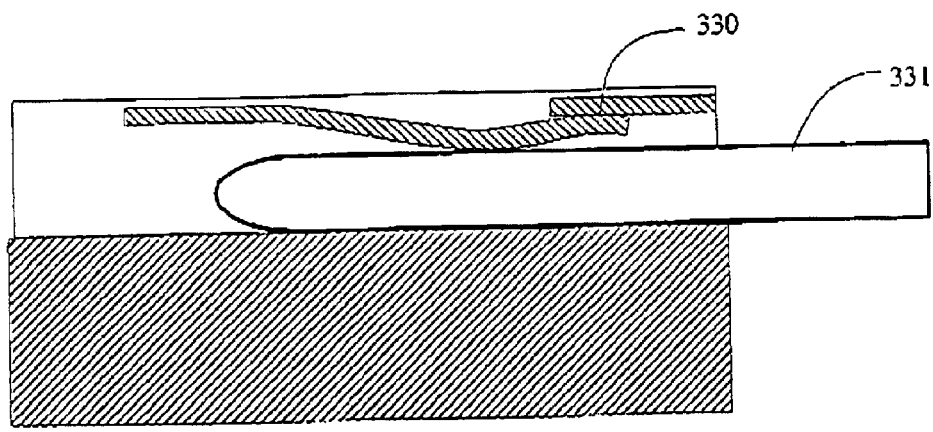
FIG. 14 illustrates another alternate embodiment for retaining an alignment pin in a groove of a ferrule.
Figure 15:
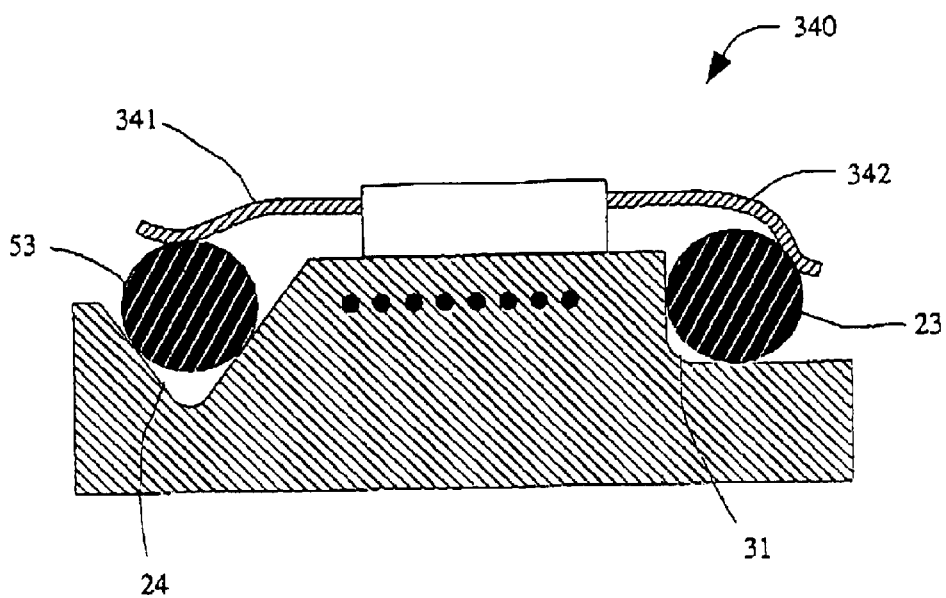
FIG. 15 shows another alternate retaining means for a ferrule subassembly configured similar to the ferrule subassembly of FIGS. 2A, 2B.

FIGS. 13, 14 and 15 illustrate alternate embodiments for retaining an alignment pin in a groove of a ferrule. In FIG. 13, an alignment pin 324 is retained in a groove of a ferrule by a retaining member 320 having a plurality of openings 321. In each of the openings 321, there is an elastic material 322, e.g., polyurethane, with a metal, ceramic or a plastic pad 323 attached thereto. The selection of material for the pad 323, as well as the elastic material 322, will depend upon material compatibility and alignment requirements. The pads 323 abut the alignment pin 324 to retain the alignment pin in the ferrule groove. It should be noted that the elastic material 322 causes an elastic retention force to be exerted on the alignment pin.

FIG. 14 shows an alignment pin 331 retained in a groove of a ferrule by a spring member 330 that is configured as a leaf spring. A leaf spring configuration may be desirable, for example, where a higher spring force is required for a shorter spring length. FIG. 15 shows a spring beam spring design utilized for a ferrule 340 that is configured similar to the first ferrule subassembly 20 as shown in FIGS. 1, 2A, 2B. The ferrule 340 includes the substantially V-shaped surface portion 24 in a vertical orientation and the substantially V-shaped surface portion 31 in a 45 degree orientation. A first spring beam 341 exerts a vertical, pre-load force on the alignment pin 53 to hold the alignment pin 53 in the substantially V-shaped surface portion 24. A second spring beam 342 exerts a diagonal, pre-load force on the alignment pin 23 to hold the alignment pin 23 in the substantially V-shaped surface portion 31. The first and second spring beams 341, 342 in effect are thus configured to provide biasing actions similar to the biasing actions provided by the biasing members 25, 32, 33 of FIGS. 2A, 2B.

Figure 16:
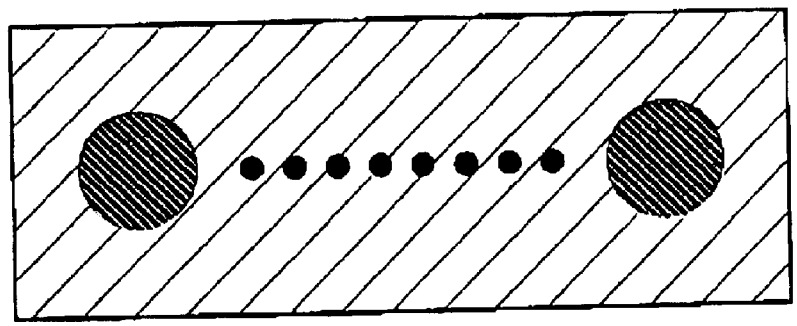
FIG. 16 illustrates a cross-sectional view of a prior art MT ferrule.
Figure 17:
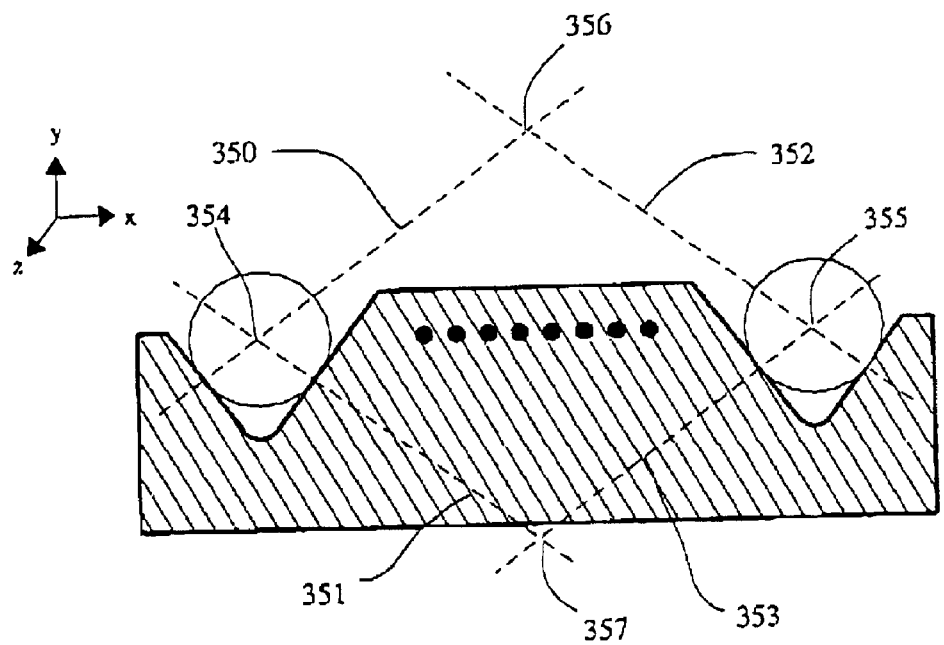
FIG. 17 illustrates a cross-sectional view of a prior art ferrule disclosed in U.S. Pat. No. 5,416,868.

FIGS. 16 and 17 are schematic drawings of prior art ferrules. FIG. 16 illustrates the MT ferrule described in the Background of the Invention section. In the MT ferrule, there are two cylindrical holes for holding alignment pins. As the holes are typically sized to snugly retain the alignment pins, the mating of two MT ferrules (both ferrules are of the same geometry) can pose a problem where, for example, there is alignment pin diameter discrepancy. This can result in loss of signal fidelity across the ferrule-to-ferrule interface. Note that the MT ferrule represents either an over-constrained or under constrained condition depending on clearance conditions.

FIG. 17 illustrates another prior art ferrule disclosed by the prior art. This ferrule design can be found, for example, in U.S. Pat. No. 5,416,868 issued to Kakii et al. For this ferrule design, both of the mating ferrules have two V-shaped grooves for holding alignment pins. When two ferrules are mated, there are four constraint lines 350, 351, 352, 353 in the X-Y plane of the mating interface, which intersect at four points in space 354, 355, 356, 357. First and second constraint lines, 350 and 351, intersect (354) at the center of a first alignment pin. These constraint lines, 350 and 351, prevent movement of the first alignment pin in the linear X and Y degrees of freedom and in the rotational X and Y degrees of freedom (out of the plane). Third and fourth constraint lines, 352 and 353, intersect (355) at the center of a second alignment pin, and the third constraint line 352 intersects (356) the first constraint line 350 and the fourth constraint line 353 intersects (357) the second constraint line 351. Because there are four unique constraints but only three degrees of freedom to constrain in the X-Y plane, the mating is over-constrained, i.e., both ferrules are independent in that they both can fully constrain the alignment pins. Due to the over-constraint on the mating interface, this ferrule assembly is susceptible to loss of signal fidelity across the ferrule-to-ferrule interface.

It should be apparent to one of ordinary skill in the art that the ferrule designs and features are not limited to the embodiments described herein. For example, while FIG. 12 demonstrates that the ferrule designs shown in cases 1 and 2 are less desirable from an alignment pin diameter discrepancy viewpoint, there may be situations where the ferrule designs shown in cases 1 and 2 are desirable for specific applications. Thus, the inventors of the present invention do not exclude such designs from the spirit and scope of the present invention.

Furthermore, it should be apparent to one of ordinary skill in the art that these alignment systems will work for a single fiber, two fibers, or more than two fibers. Also, the alignment systems described above will work for linear (1×N) arrays of fibers, matrix of fibers (M×N), and circular arrays (R×theta). And the invention as described herein could be used to connect an array of optical fibers to an individual or array of Vertical Cavity Surface Emitting Lasers ("VCSEL") or an individual or array of detectors (typically diodes).

What is claimed is:

1. A ferrule assembly for providing butt coupling between at least a first optical fiber and a second optical fiber, the ferrule assembly comprising:

at least a first alignment member and a second alignment member;

a first ferrule comprising:
a first body for receiving the first optical fiber, the first body having top, bottom, and side walls, wherein linear movement in the direction from one side wall to another being defined as lateral direction and linear movement in the direction from top to bottom or bottom to top being defined as vertical direction;

the first body further having a first surface portion for retaining the first alignment member and a second surface portion for retaining the second alignment member;

a first biasing member providing a first retaining force to hold the first alignment member against the first surface portion, the first biasing member and the first surface portion constraining movement of the first alignment member substantially in both the lateral direction and the vertical direction;

a second biasing member providing a second retaining force to hold the second alignment member against the second surface portion, the second biasing member and the second surface portion constraining movement of the second alignment member substantially in both the lateral direction and the vertical direction;

a second ferrule comprising:
  a second body for receiving the second optical fiber, the second body having top, bottom, and side walls;
  the second body further having a third surface portion for retaining the first alignment member and a fourth surface portion for retaining the second alignment member;
  a third biasing member providing a third retaining force to hold the first alignment member against the third surface portion, the third biasing member and the third surface portion constraining movement of the first alignment member substantially in both the lateral direction and the vertical direction;
  a fourth biasing member providing a fourth retaining force to hold the second alignment member against the fourth surface portion, the fourth biasing member and the fourth surface portion constraining movement of the second alignment member substantially in only the vertical direction; and
  wherein the first and second alignment members provide alignment of the first and second optical fibers during mating of the first and second ferrules.

2. The ferrule assembly of claim 1, wherein the first body and the second body are made from metal.

3. The ferrule assembly of claim 1, wherein the first body and the second body are made from plastic.

4. The ferrule assembly of claim 1, wherein the first body comprises a top portion and a bottom portion and the second body comprises a top portion and a bottom portion.

5. The ferrule assembly of claim 4, wherein the bottom portions of both the first body and the second body are made from metal.

6. The ferrule assembly of claim 4, wherein the top portions of both the first body and the second body are made from plastic.

7. The ferrule assembly of claims 4, wherein the top portions of both the first body and the second body are made from ceramic.

8. The ferrule assembly of claim 1, wherein the first, second, third and fourth biasing members comprise a retaining member and pads elastically attached to the retaining member, the pads abutting the corresponding alignment member.

9. A ferrule assembly having first and second ferrules for providing butt coupling between at least a first optical fiber and a second optical fiber, the first ferrule being different from the second ferrule and the ferrule assembly comprising:
  at least a first alignment member and a second alignment member;
  the first ferrule comprising:
    a first body for receiving the first optical fiber, the first body having top, bottom, and side walls, wherein linear movement in the direction from one side wall to another being defined as lateral direction and linear movement in the direction from top to bottom or bottom to top being defined as vertical direction;
    the first body further having a first surface portion for retaining the first alignment member and a second surface portion for retaining the second alignment member;
    a first biasing member secured to the first body and providing a first retaining force to hold the first alignment member against the first surface portion, the first biasing member and the first surface portion constraining movement of the first alignment member substantially in both the lateral direction and the vertical direction;
    a second biasing member secured to the first body and providing a second retaining force to hold the second alignment member against the second surface portion, the second biasing member and the second surface portion constraining movement of the second alignment member substantially in both the lateral direction and the vertical direction;
  the second ferrule comprising:
    a second body for receiving the second optical fiber, the second body having top, bottom, and side walls;
    the second body further having a third surface portion for retaining the first alignment member and a fourth surface portion for retaining the second alignment member;
    a third biasing member secured to the second body and providing a third retaining force to hold the first alignment member against the third surface portion, the third biasing member and the third surface portion constraining movement of the first alignment member substantially in both the lateral direction and the vertical direction;
    a fourth biasing member secured to the second body and providing a fourth retaining force to hold the second alignment member against the fourth surface portion, the fourth biasing member and the fourth surface portion constraining movement of the second alignment member substantially in only the vertical direction; and
    wherein the first and second alignment members provide alignment of the first and second optical fibers during mating of the first and second ferrules.

10. The ferrule assembly of claim 9, wherein the first body and the second body are made from metal.

11. The ferrule assembly of claim 9, wherein the first body and the second body are made from plastic.

12. The ferrule assembly of claim 9, wherein the first body comprises a top portion and a bottom portion and the second body comprises a top portion and a bottom portion.

13. The ferrule assembly of claim 12, wherein the bottom portions of both the first body and the second body are made from metal.

14. The ferrule assembly of claim 12, wherein the top portions of both the first body and the second body are made from plastic.

15. The ferrule assembly of claim 12, wherein the top portions of both the first body and the second body are made from ceramic.

* * * * *